April 20, 1937.   C. McG. SYKES   2,077,495
WEIGHING APPARATUS
Filed Nov. 1, 1933
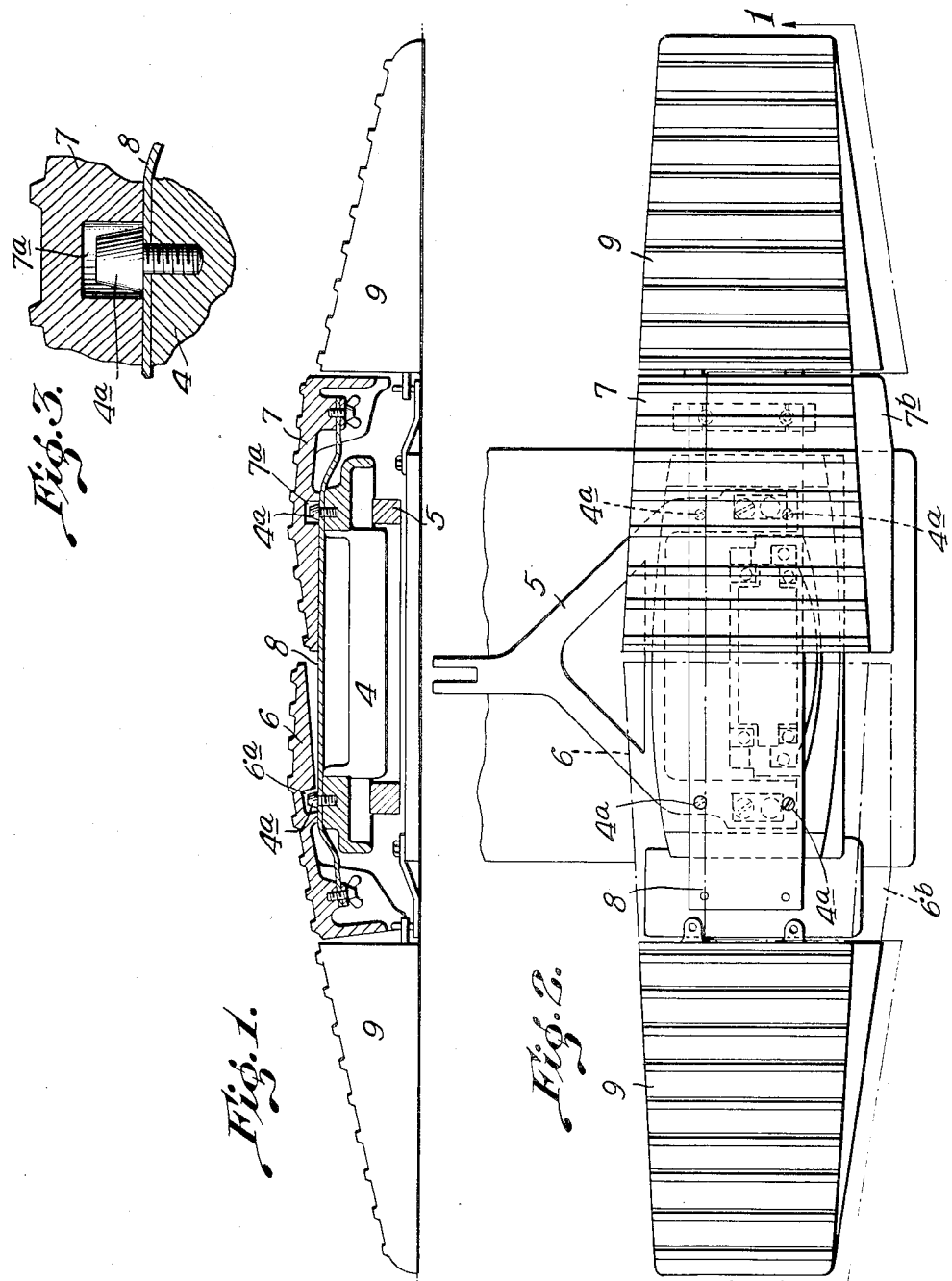

Patented Apr. 20, 1937

2,077,495

UNITED STATES PATENT OFFICE 2,077,495

WEIGHING APPARATUS

Cameron McGregor Sykes, Soho Foundry, Birmingham, England, assignor to W. & T. Avery Limited, Birmingham, England Application November 1, 1933, Serial No. 696,239
In Great Britain November 3, 1932

4 Claims. (Cl. 265—27)

This invention has reference to improvements relating to weighing apparatus, and is an addition to or modification of the weighing apparatus described and claimed in my prior patent specification Serial No. 612,686 filed 21st May, 1932, which has matured into a Patent No. 1,936,178.

In connection with apparatus of the kind described in my aforesaid U. S. patent specification it has been found that when dealing with vehicles using low pressure tyres of great width there is a tendency for portions of the tyre to overhang the weighing platform and to foul non-weighing portions of the apparatus thereby preventing a true weighing operation being effected.

The present invention has for its object the provision of an improved means for overcoming the aforesaid objection, which, furthermore, ensures a gradual application or removal of a load to or from the weighing mechanism.

The invention consists of an addition to or modification of the weighing apparatus described and claimed in my said U. S. patent specification, 1,936,178, characterized in that the load is received by a pair of oppositely disposed members which are rockably mounted relatively to a member which transmits the load to the weighing mechanism, said rockable members incorporating ramps.

The invention will now be described with particular reference to the accompanying sheet of drawings, wherein:—

Figure 1 is a part sectional front elevation illustrating the invention as applied to weighing apparatus of the kind described in my aforesaid United States patent specification No. 1,936,178, Figure 2 is a plan of the portion of the weighing apparatus illustrated in Figure 1 with part broken away where desirable for the sake of clearness and Figure 3 is a fragmentary view illustrating on a larger scale the method of mounting the load receiving members.

The verge or stool 4 which is supported from the weighing lever 5 is provided with pairs of upstanding studs 4ᵃ of a frusto-conical shape. These studs engage within holes 6ᵃ and 7ᵃ formed in a pair of oppositely disposed lever members 6 and 7 termed hereinafter the load receiving members. The said load receiving members 6 and 7 are provided with oppositely inclined surfaces so that when the said members are under load the load rests in a substantially V-shaped recess. The dimensions and angles of inclination of the studs 4ᵃ are such that the load receiving members 6 and 7 are permitted a limited rocking movement said movement being regulated by a flexure plate 8 the intermediate portion of which rests on the stool or verge 4 and the ends of which are anchored to the respective load receiving members 6 and 7. The load receiving members 6 and 7 are provided with side flanges 6ᵇ, 7ᵇ so that they shroud the weighing mechanism and adjacent non-weighing parts whereby there is no possibility of low pressure tyres of great width fouling the non-weighing parts and thus upsetting the accuracy of a weighment. The load receiving members 6 and 7 co-operate with ramps 9 which are connected to each end of the apparatus thus when a load is being placed on the apparatus the wheel rides up the ramp and gradually applies the load to the weighing mechanism. When the wheel rides over the studs 4ᵃ the load receiving member 6 rocks so that the inwardly directed portion thereof moves downwardly the wheel then seating itself in the V-shaped depression constituted by the downwardly and inwardly pressed arms of the load receiving members 6 and 7.

After a weighing operation has been effected a movement of the wheel in passing off the load receiving members 6 and 7 rocks the load receiving member 7 on the outgoing side of the apparatus and rides down the ramp 9 associated therewith.

What I claim is:—

1. Weighing apparatus for ascertaining the axle loading of vehicles comprising in combination a weighing lever, a member supported on the said lever and adapted to transmit the load thereto, a pair of load receiving members rockably mounted on said load transmitting member and having oppositely inclined surfaces which provide means for leading a wheel to and from the weighing position and for providing a V-shaped seating for the wheel when in the weighing position and a flexure plate the intermediate portion whereof rests on said load transmitting member and the end portions whereof are secured to the load receiving members for regularizing the movement thereof.

2. Weighing apparatus for ascertaining the axle loading of vehicles comprising a weighing lever, a member supported on said lever for transmitting the load thereto, studs carried by said load receiving member, a pair of oppositely disposed load receiving members pivotally mounted on said studs, inwardly directed arms to said members which extend substantially to the centre of the load transmitting member and which when tilted downwardly under load provide a V-shaped seating for a vehicle wheel, outwardly directed arms to said load receiving members which are normally downwardly inclined and which serve to provide means for leading a wheel to and from the weighing position and a flexure plate the intermediate portion whereof rests on said load transmitting member and the end portions whereof are secured to the load receiving members for regularizing the movement thereof.

3. Weighing apparatus for ascertaining the axle loading of vehicles comprising a weighing lever, a load transmitting member supported on said lever, a pair of load receiving members rockably mounted on said load transmitting member and having oppositely inclined surfaces which provide means for leading a wheel to and from the weighing position and for providing a V-shaped seating for accommodating a wheel during weighing, ramps adapted to co-operate with the outwardly and downwardly inclined surfaces of the said load receiving members to facilitate the movement of a wheel to and from a weighing position and a flexure plate the intermediate portion whereof rests on said load transmitting member and the end portions whereof are secured to the load receiving members for regularizing the movement thereof.

4. Weighing apparatus for ascertaining the axle load of vehicles, embodying a weighing lever, a load transmitting member supported on said lever, upstanding projections carried by said load transmitting member and arranged at the corners of a rectangle, a pair of oppositely disposed load receiving members, recesses in the underside of said load receiving members adapted to engage over the aforesaid projections the angle of inclination of the sides of the projection being greater than the angle of inclination of the walls of the recesses in order to provide for a rocking of the load receiving members, oppositely inclined surfaces to said load receiving members which provide means for leading a wheel to and from the weighing position and for providing a V-shaped seating for accommodating a wheel during weighing, side flanges to the load receiving members which prevent any overhanging portion of the load fouling the weighing mechanism during the movement of a wheel into the weighing position and during a weighing operation and a flexure plate the intermediate portion whereof rests on said load transmitting member and the end portions of which are secured to the load receiving members for regularizing the movement thereof.

CAMERON McGREGOR SYKES.